US009400797B2

(12) United States Patent
Yang et al.

(10) Patent No.: US 9,400,797 B2
(45) Date of Patent: Jul. 26, 2016

(54) SYSTEMS AND METHODS FOR RECOVERED DATA STITCHING

(71) Applicant: LSI Corporation, San Jose, CA (US)

(72) Inventors: Shaohua Yang, San Jose, CA (US); Xuebin Wu, San Jose, CA (US); Shu Li, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 347 days.

(21) Appl. No.: 14/047,319

(22) Filed: Oct. 7, 2013

(65) Prior Publication Data

US 2015/0081626 A1   Mar. 19, 2015

Related U.S. Application Data (60) Provisional application No. 61/878,678, filed on Sep. 17, 2013, provisional application No. 61/885,314, filed on Oct. 1, 2013.

(51) Int. Cl.
| | |
|---|---|
| *G06F 11/00* | (2006.01) |
| *H03M 13/00* | (2006.01) |
| *G06F 17/30* | (2006.01) |
| *G06F 11/08* | (2006.01) |
| *G06F 11/10* | (2006.01) |
| *G11B 20/10* | (2006.01) |
| *G11B 20/18* | (2006.01) |

(52) U.S. Cl.
CPC ........ *G06F 17/30135* (2013.01); *G06F 11/085* (2013.01); *G06F 11/1076* (2013.01); *G11B 20/10009* (2013.01); *G11B 20/10268* (2013.01); *G11B 20/18* (2013.01); *G11B 20/1866* (2013.01)

(58) Field of Classification Search
None
See application file for complete search history.

(56) References Cited

U.S. PATENT DOCUMENTS

| | | | |
|---|---|---|---|
| 4,553,221 A | 11/1985 | Hyatt | |
| 4,805,174 A | 2/1989 | Kubot | |
| 5,278,703 A | 1/1994 | Rub et al. | |
| 5,278,846 A | 1/1994 | Okayama | |
| 5,317,472 A | 5/1994 | Schweitzer, III | |
| 5,325,402 A | 6/1994 | Ushirokawa | |

(Continued)

FOREIGN PATENT DOCUMENTS

| | | |
|---|---|---|
| JP | 2001/319433 A | 11/2001 |
| WO | WO 2010/059264 A1 | 5/2010 |
| WO | WO 2010/126482 A1 | 11/2010 |

OTHER PUBLICATIONS

U.S. Appl. No. 13/174,453, Unpublished filed Jun. 30, 2011 Johnson Yen.

(Continued)

*Primary Examiner* — Daniel McMahon (57) ABSTRACT

Systems and method relating generally to data processing, and more particularly to systems and methods for combining recovered portions of a data set. In one particular case, a system is disclosed that includes a stitching circuit and a data recovery circuit. The stitching circuit is operable to: receive a data set including at least a first fragment and a second fragment; replicate data from at least one of the first fragment and the second fragment as stitching values; and aggregate the first fragment with the second fragment with the stitching values between the first fragment and the second fragment to yield a combined data set. The data recovery circuit is operable to process the combined data set to yield an original data set.

20 Claims, 7 Drawing Sheets

(56) References Cited

U.S. PATENT DOCUMENTS

| | | | |
|---|---|---|---|
| 5,351,274 A | 9/1994 | Chennakeshu | |
| 5,392,299 A | 2/1995 | Rhines | |
| 5,406,593 A | 4/1995 | Chennakeshu | |
| 5,417,500 A | 5/1995 | Martinie | |
| 5,450,253 A | 9/1995 | Seki | |
| 5,513,192 A | 4/1996 | Janku | |
| 5,523,903 A | 6/1996 | Hetzler | |
| 5,550,810 A | 8/1996 | Monogioudis et al. | |
| 5,550,870 A | 8/1996 | Blaker | |
| 5,612,964 A | 3/1997 | Haraszti | |
| 5,696,504 A | 12/1997 | Oliveros | |
| 5,710,784 A | 1/1998 | Kindred | |
| 5,717,706 A | 2/1998 | Ikeda | |
| 5,719,871 A | 2/1998 | Helm | |
| 5,802,118 A | 9/1998 | Bliss | |
| 5,818,806 A * | 10/1998 | Wong | G11B 7/0052 360/53 |
| 5,844,945 A | 12/1998 | Nam | |
| 5,898,710 A | 4/1999 | Amrany | |
| 5,923,713 A | 7/1999 | Hatakeyama | |
| 5,978,414 A | 11/1999 | Nara | |
| 5,983,383 A | 11/1999 | Wolf | |
| 6,005,897 A | 12/1999 | Mccallssister | |
| 6,023,783 A | 2/2000 | Divsalar | |
| 6,029,264 A | 2/2000 | Kobayashi | |
| 6,065,149 A | 5/2000 | Yamanaka | |
| 6,097,764 A | 8/2000 | McCallister | |
| 6,145,110 A | 11/2000 | Khayrallah | |
| 6,175,588 B1 | 1/2001 | Visotsky | |
| 6,216,249 B1 | 4/2001 | Bliss | |
| 6,216,251 B1 | 4/2001 | McGinn | |
| 6,266,795 B1 | 7/2001 | Wei | |
| 6,317,472 B1 | 11/2001 | Choi | |
| 6,351,832 B1 | 2/2002 | Wei | |
| 6,377,610 B1 | 4/2002 | Hagenauer | |
| 6,381,726 B1 | 4/2002 | Weng | |
| 6,393,074 B1 | 5/2002 | Mandyam | |
| 6,412,088 B1 | 6/2002 | Patapoutian et al. | |
| 6,473,878 B1 | 10/2002 | Wei | |
| 6,535,553 B1 | 3/2003 | Limberg et al. | |
| 6,625,775 B1 | 9/2003 | Kim | |
| 6,643,814 B1 | 11/2003 | Cideciyan et al. | |
| 6,690,524 B1 * | 2/2004 | Wakefield | G11B 19/04 360/51 |
| 6,697,441 B1 | 2/2004 | Bottomley | |
| 6,747,827 B1 | 6/2004 | Bassett et al. | |
| 6,748,034 B2 | 6/2004 | Hattori | |
| 6,757,862 B1 | 6/2004 | Marianetti, II | |
| 6,785,863 B2 | 8/2004 | Blankenship | |
| 6,807,238 B1 | 10/2004 | Rhee | |
| 6,810,502 B2 | 10/2004 | Eidson | |
| 6,839,774 B1 | 1/2005 | Ahn et al. | |
| 6,948,113 B1 | 9/2005 | Shaver | |
| 6,970,511 B1 | 11/2005 | Barnette | |
| 6,975,692 B2 | 12/2005 | Razzell | |
| 6,986,098 B2 | 1/2006 | Poeppelman | |
| 7,035,327 B2 | 4/2006 | Nakajima et al. | |
| 7,047,474 B2 | 5/2006 | Rhee | |
| 7,058,853 B1 | 6/2006 | Song et al. | |
| 7,058,873 B2 | 6/2006 | Song | |
| 7,073,118 B2 | 7/2006 | Greenberg | |
| 7,093,179 B2 | 8/2006 | Shea | |
| 7,117,427 B2 | 10/2006 | Ophir | |
| 7,133,228 B2 | 11/2006 | Fung | |
| 7,136,244 B1 | 11/2006 | Rothberg | |
| 7,184,486 B1 | 2/2007 | Wu | |
| 7,191,378 B2 | 3/2007 | Eroz | |
| 7,203,887 B2 | 4/2007 | Eroz | |
| 7,230,550 B1 | 6/2007 | Mittal | |
| 7,237,181 B2 | 6/2007 | Richardson | |
| 7,308,061 B1 | 12/2007 | Huang | |
| 7,310,768 B2 | 12/2007 | Eidson | |
| 7,313,750 B1 | 12/2007 | Feng | |
| 7,370,258 B2 | 5/2008 | Iancu | |
| 7,415,651 B2 | 8/2008 | Argon | |
| 7,502,189 B2 | 3/2009 | Sawaguchi | |
| 7,523,375 B2 | 4/2009 | Spencer | |
| 7,587,657 B2 | 9/2009 | Haratsch | |
| 7,590,168 B2 | 9/2009 | Raghavan | |
| 7,596,196 B1 | 9/2009 | Liu et al. | |
| 7,646,829 B2 | 1/2010 | Ashley | |
| 7,702,986 B2 | 4/2010 | Bjerke | |
| 7,738,202 B1 | 6/2010 | Zheng | |
| 7,752,523 B1 | 7/2010 | Chaichanavong | |
| 7,779,325 B2 | 8/2010 | Song | |
| 7,802,172 B2 | 9/2010 | Casado | |
| 7,952,824 B2 | 5/2011 | Dziak | |
| 7,957,251 B2 | 6/2011 | Ratnakar Aravind | |
| 7,958,425 B2 | 6/2011 | Chugg | |
| 7,996,746 B2 | 8/2011 | Livshitz | |
| 8,018,360 B2 | 9/2011 | Nayak | |
| 8,020,069 B1 | 9/2011 | Feng | |
| 8,020,078 B2 | 9/2011 | Richardson | |
| 8,161,361 B1 | 4/2012 | Song et al. | |
| 8,201,051 B2 | 6/2012 | Tan | |
| 8,225,168 B2 | 7/2012 | Yu et al. | |
| 8,237,597 B2 | 8/2012 | Liu | |
| 8,255,765 B1 | 8/2012 | Yeo | |
| 8,261,171 B2 | 9/2012 | Annampedu | |
| 8,291,284 B2 | 10/2012 | Savin | |
| 8,291,299 B2 | 10/2012 | Li et al. | |
| 8,295,001 B2 | 10/2012 | Liu | |
| 8,296,637 B1 | 10/2012 | Varnica | |
| 8,370,711 B2 | 2/2013 | Alrod | |
| 8,381,069 B1 | 2/2013 | Liu | |
| 8,413,032 B1 | 4/2013 | Song | |
| 8,429,498 B1 | 4/2013 | Anholt | |
| 8,443,267 B2 | 5/2013 | Zhong et al. | |
| 8,458,555 B2 | 6/2013 | Gunnam | |
| 8,464,142 B2 | 6/2013 | Gunnam | |
| 8,495,462 B1 | 7/2013 | Liu | |
| 8,516,339 B1 | 8/2013 | Lesea | |
| 8,527,849 B2 | 9/2013 | Jakab | |
| 2001/0010089 A1 | 7/2001 | Gueguen | |
| 2001/0016114 A1 | 8/2001 | Van Gestel et al. | |
| 2002/0021519 A1 | 2/2002 | Rae | |
| 2002/0067780 A1 | 6/2002 | Razzell | |
| 2002/0168033 A1 | 11/2002 | Suzuki | |
| 2003/0031236 A1 | 2/2003 | Dahlman | |
| 2003/0123364 A1 | 7/2003 | Nakajima et al. | |
| 2003/0126527 A1 | 7/2003 | Kim et al. | |
| 2003/0138102 A1 | 7/2003 | Kohn et al. | |
| 2003/0147168 A1 | 8/2003 | Galbraith et al. | |
| 2003/0161422 A1 * | 8/2003 | Bi | H04B 1/7103 375/348 |
| 2003/0188252 A1 | 10/2003 | Kim | |
| 2004/0042436 A1 | 3/2004 | Terry et al. | |
| 2004/0194007 A1 | 9/2004 | Hocevar | |
| 2004/0228021 A1 | 11/2004 | Yamazaki | |
| 2004/0264284 A1 | 12/2004 | Priborsky et al. | |
| 2005/0047514 A1 | 3/2005 | Bolinth | |
| 2005/0149842 A1 | 7/2005 | Kyung | |
| 2005/0210367 A1 | 9/2005 | Ashikhmin | |
| 2005/0243456 A1 | 11/2005 | Mitchell et al. | |
| 2006/0002689 A1 | 1/2006 | Yang et al. | |
| 2006/0159355 A1 | 7/2006 | Mizuno | |
| 2006/0195730 A1 | 8/2006 | Kageyama | |
| 2007/0113161 A1 * | 5/2007 | Lingam | H03M 13/395 714/796 |
| 2007/0185902 A1 | 8/2007 | Messinger et al. | |
| 2007/0234178 A1 | 10/2007 | Richardson | |
| 2007/0297496 A1 | 12/2007 | Park et al. | |
| 2008/0037676 A1 | 2/2008 | Kyun et al. | |
| 2008/0069373 A1 | 3/2008 | Jiang | |
| 2008/0140686 A1 | 6/2008 | Hong | |
| 2008/0304558 A1 | 12/2008 | Zhu et al. | |
| 2009/0003301 A1 | 1/2009 | Reial | |
| 2009/0092174 A1 | 4/2009 | Wang | |
| 2009/0106633 A1 | 4/2009 | Fujiwara | |
| 2009/0125780 A1 | 5/2009 | Taylor | |
| 2009/0132893 A1 | 5/2009 | Miyazaki | |
| 2009/0150745 A1 | 6/2009 | Langner et al. | |
| 2009/0177852 A1 | 7/2009 | Chen | |
| 2009/0185643 A1 | 7/2009 | Fitzpatrick | |

(56) References Cited

U.S. PATENT DOCUMENTS

| | | |
|---|---|---|
| 2009/0216942 A1 | 8/2009 | Yen |
| 2009/0273492 A1 | 11/2009 | Yang et al. |
| 2010/0077276 A1 | 3/2010 | Okamura et al. |
| 2010/0088575 A1 | 4/2010 | Sharon et al. |
| 2010/0150252 A1 | 6/2010 | Camp |
| 2010/0172046 A1 | 7/2010 | Liu et al. |
| 2010/0241921 A1 | 9/2010 | Gunam |
| 2010/0268996 A1 | 10/2010 | Yang |
| 2010/0322048 A1 | 12/2010 | Yang et al. |
| 2010/0325511 A1 | 12/2010 | Oh |
| 2011/0041040 A1 | 2/2011 | Su |
| 2011/0043938 A1 | 2/2011 | Mathew |
| 2011/0066768 A1 | 3/2011 | Brittner et al. |
| 2011/0167227 A1 | 7/2011 | Yang |
| 2011/0258508 A1 | 10/2011 | Ivkovic |
| 2011/0264987 A1 | 10/2011 | Li |
| 2011/0307760 A1 | 12/2011 | Pisek |
| 2011/0320902 A1 | 12/2011 | Gunnam |
| 2012/0020402 A1 | 1/2012 | Ibing |
| 2012/0038998 A1 | 2/2012 | Mathew |
| 2012/0063023 A1 | 3/2012 | Mathew |
| 2012/0079353 A1 | 3/2012 | Liikanen |
| 2012/0124118 A1 | 5/2012 | Ivkovic |
| 2012/0182643 A1 | 7/2012 | Zhang |
| 2012/0185744 A1 | 7/2012 | Varnica |
| 2012/0203986 A1 | 8/2012 | Strasser et al. |
| 2012/0207201 A1 | 8/2012 | Xia |
| 2012/0212849 A1 | 8/2012 | Xu |
| 2012/0236428 A1 | 9/2012 | Xia |
| 2012/0262814 A1 | 10/2012 | Li |
| 2012/0265488 A1 | 10/2012 | Sun |
| 2012/0317462 A1 | 12/2012 | Liu et al. |
| 2013/0024740 A1 | 1/2013 | Xia |
| 2013/0031440 A1 | 1/2013 | Sharon |
| 2013/0120169 A1 | 5/2013 | Li |
| 2013/0194955 A1 | 8/2013 | Chang |
| 2013/0198580 A1 | 8/2013 | Chen |
| 2013/0238955 A1 | 9/2013 | D'Abreu |
| 2013/0254616 A1 | 9/2013 | Yang |
| 2013/0254619 A1 | 9/2013 | Zhang |

OTHER PUBLICATIONS

U.S. Appl. No. No. 13/171,615, Unpublished filed Jun. 29, 2011 Bradley D. Seago.
U.S. Appl. No. 13/239,683, Unpublished filed Sep. 22, 2011 Changyou Xu.
U.S. Appl. No. 13/327,279, Unpublished filed Dec. 15, 2011 Wei Feng.
U.S. Appl. No. 13/300,078, Unpublished filed Nov. 18, 2011 Chung-Li Wang.
U.S. Appl. No. 13/945,787, Unpublished filed Jul. 18, 2013 Shu Li.
U.S. Appl. No. 13/415,326, Unpublished filed Mar. 8, 2012 Shaohua Yang.
U.S. Appl. No. 13/705,407, Unpublished filed Dec. 5, 2012 Lingyan Sun.
U.S. Appl. No. 13/227,544, Unpublished filed Sep. 8, 2011 Shaohua Yang.
U.S. Appl. No. 13/483,105, Unpublished filed May 30, 2012 Xuebin Wu.
U.S. Appl. No. 13/445,848, Unpublished filed Apr. 12, 2012 Bruce Wilson.
U.S. Appl. No. 13/426,693, Unpublished filed Mar. 22, 2012 Shaohua Yang.
U.S. Appl. No. 13/652,012, Unpublished filed Oct. 15, 2012 Fan Zhang.
U.S. Appl. No. 13/746,301, Unpublished filed Jan. 21, 2013 Shu Li.
U.S. Appl. No. 13/766,911, Unpublished filed Feb. 14, 2013 Shaohua Yang.
U.S. Appl. No. 13/415,430, Unpublished filed Mar. 8, 2012 Nayak Ratnakar Aravind.
U.S. Appl. No. 13/875,357, Unpublished filed May 2, 2013 Shaohua Yang.
U.S. Appl. No. 13/483,100, Unpublished filed May 30, 2012 Fan Zhang.
U.S. Appl. No. 13/945,777, Unpublished filed Jul. 18, 2013 Shu Li.
U.S. Appl. No. 13/944,966, Unpublished filed Jul. 18, 2013 Fan Zhang.
U.S. Appl. No. 13/868,779, Unpublished filed Apr. 23, 2013 Fan Zhang.
U.S. Appl. No. 13/853,711, Unpublished filed Mar. 29, 2013 Shu Li.
U.S. Appl. No. 13/918,510, Unpublished filed Jun. 14, 2013 Shu Li.
U.S. Appl. No. 13/770,008, Unpublished filed Feb. 19, 2013 Shaohua Yang.
U.S. Appl. No. 13/912,059, Unpublished filed Jun. 6, 2013 Fan Zhang.
U.S. Appl. No. 13/954,573, Unpublished filed Jul. 30, 2013 Kaitlyn T. Nguyen.
U.S. Appl. No. 13/766,891, Unpublished filed Feb. 14, 2013 Shu Li.
U.S. Appl. No. 13/316,741, Unpublished filed Dec. 12, 2011 Yang Han.
U.S. Appl. No. 13/372,580, Unpublished filed Feb. 14, 2012 Fan Zhang.
U.S. Appl. No. 13/422,986, Unpublished filed Mar. 16, 2012 Fan Zhang.
U.S. Appl. No. 13/474,660, Unpublished filed May 17, 2012 Zongwang Li.
U.S. Appl. No. 13/433,693, Unpublished filed Mar. 29, 2012 Fan Zhang.
U.S. Appl. No. 13/412,520, Unpublished filed Mar. 5, 2012 Fan Zhang.
U.S. Appl. No. 13/362,409, Unpublished filed Jan. 31, 2012 Fan Zhang.
U.S. Appl. No. 13/113,219, Unpublished filed May 23, 2011 Yang Han.
U.S. Appl. No. 13/316,858, Unpublished filed Dec. 12, 2011 Zongwang Li.
U.S. Appl. No. 13/426,714, Unpublished filed Mar. 22, 2012 Shaohua Yang.
U.S. Appl. No. 13/295,150, Unpublished filed Nov. 14, 2011 Zongwang Li.
U.S. Appl. No. 13/284,767, Unpublished filed Oct. 28, 2011 Fan Zhang.
U.S. Appl. No. 13/596,819, Unpublished filed Aug. 28, 2012 Shaohua Yang.
U.S. Appl. No. 13/596,947, Unpublished filed Aug. 28, 2012 Fan Zhang.
U.S. Appl. No. 13/596,978, Unpublished filed Aug. 28, 2012 Fan Zhang.
U.S. Appl. No. 13/597,001, Unpublished filed Aug. 28, 2012 Fan Zhang.
U.S. Appl. No. 13/619,907, Unpublished filed Sep. 14, 2012 Fan Zhang.
U.S. Appl. No. 13/621,341, Unpublished filed Sep. 17, 2012 Shaohua Yang.
U.S. Appl. No. 13/989,583, Unpublished filed Oct. 15, 2012 Shaohua Yang.
U.S. Appl. No. 13/269,852, Unpublished filed Oct. 10, 2011 Haitao Xia.
U.S. Appl. No. 13/269,832, Unpublished filed Oct. 10, 2011 Haitao Xia.
U.S. Appl. No. 13/284,730, Unpublished filed Oct. 28, 2011 Fan Zhang.
Vasic, B., "High-Rate Girth-Eight Codes on Rectangular Integer Lattices", IEEE Trans. Communications, vol. 52, Aug. 2004, pp. 1248-1252.
Vasic, B., "High-Rate Low-Density Parity-Check Codes Based on Anti-Pasch Affine Geometries," Proc ICC 2002, pp. 1332-1336.
Weon-Cheol Lee et al., "Vitierbi Decoding Method Using Channel State Info. in COFDM System" IEEE Trans. on Consumer Elect., IEEE Service Center, NY, NY vol. 45, No. 3 08/99.
Xiao, et al "Nested Codes With Multiple Interpretations" retrieved from the Internet URL: http://www.ece.nmsu.edu/~jkliewer/paper/XFKC_CISS06 (retrieved on Dec. 5, 2012).

(56) References Cited

OTHER PUBLICATIONS

Yeo et al., "VLSI Architecture for Iterative Decoders in Magnetic Storage Channels", Mar. 2001, pp. 748-755, IEEE trans. Magnetics, vol. 37, No. 2.
Zhang et al., "Analysis of Verification-Based Decoding on the q-ary Symmetric Channel for Large q", IEEE Trans. on Information Theory, vol. 57, No. 10 (Oct. 2011).
Zhong et al., "Design of VLSI Implementation-Oriented LDPC Codes", IEEE, pp. 670-673, 2003.
Zhong et al., "High-Rate Quasi-Cyclic LDPC Codes for Magnetic Recording Channel with Low Error Floor", ISCAS, IEEE pp. 3546-3549, May 2006.
Zhong et al., "Joint Code-Encoder Design for LDPC Coding System VLSI Implementation", ISCAS, IEEE pp. 389-392, May 2004.
Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.
Zhong, "Block-LDPC: A Practical LDPC Coding System Design Approach", IEEE Trans. on Circuits, Regular Papers, vol. 5, No. 4, pp. 766-775, Apr. 2005.
U.S. Appl. No. 13/426,714, filed Mar. 22, 2012, Shaohua Yang.
Casado et al., Multiple-rate low- density parity-check codes with constant blocklength, IEEE Transations on communications, Jan. 2009, vol. 57, pp. 75-83.
Cui et al., "High-Throughput Layered LDPC Decoding Architecture", IEEE Transactions on Very Large Scale Integration (VLSI) Systems, vol. 17, No. 4 (Apr. 2009).
Fan et al., "Constrained coding techniques for soft iterative decoders" Proc. IEEE Global Commun. Conf., vol. 1b, pp. 631-637 (1999).
Fossorier, Marc P.C. "Quasi-Cyclic Low-Density Parity-Check Codes From Circulant Permutation Maricies" IEEE Transactions on Information Theory, vol. 50, No. 8 Aug. 8, 2004.
Gross, "Stochastic Decoding of LDPC Codes over GF(q)", HDPCC Workshop, Tel Aviv (Mar. 2, 2010).
Gunnam et al., "VLSI Architectures for Layered Decoding for Irregular LDPC Codes of WiMax", IEEE ICC Proceedings (2007).
Hagenauer, J. et al A Viterbi Algorithm with Soft-Decision Outputs and its Applications in Proc. IEEE Globecom, pp. 47. 11-47 Dallas, TX Nov. 1989.
Han and Ryan, "Pinning Techniques for Low-Floor Detection/Decoding of LDPC-Coded Partial Response Channels", 5th International Symposium on Turbo Codes &Related Topics, 2008.
Kautz, "Fibonacci Codes for Synchronization Control", IEEE Trans. Info. Theory, vol. 11, No. 2, pp. 284-292 (Apr. 1965).
Kschischang et al., "Factor Graphs and the Sum-Product Algorithm", IEEE Transactions on Information Theory, vol. 47, No. 2 (Feb. 2001).
Leduc-Primeau et al., "A Relaxed Half-Stochastic Iterative Decoder for LDPC Codes", IEEE Communications Society, IEEE Globecom proceedings (2009).
Lee et al., "Partial Zero-Forcing Adaptive MMSE Receiver for DS-CDMA Uplink in Multicell Environments" IEEE Transactions on Vehicular Tech. vol. 51, No. 5, Sep. 2002.
Li et al "Efficient Encoding of Quasi-Cyclic Low-Density Parity Check Codes" IEEE Transactions on Communications on 53 (11) 1973-1973, 2005.
Lim et al. "Convergence Analysis of Constrained Joint Adaptation in Recording Channels" IEEE Trans. on Signal Processing vol. 54, No. 1 Jan. 2006.
Lin et al "An efficient VLSI Architecture for non binary LDPC decoders"—IEEE Transaction on Circuits and Systems II vol. 57, Issue 1 (Jan. 2010) pp. 51-55.
Moon et al, "Pattern-dependent noise prediction in signal-dependent Noise," IEEE JSAC, vol. 19, No. 4 pp. 730-743, Apr. 2001.
Moon et al., "Maximum transition run codes for data storage systems", IEEE Trans. Magn., vol. 32, No. 5, pp. 3992-3994 (Sep. 1996).
Patapoutian et al "Improving Re-Read Strategies by Waveform Averaging" IEEE Transactions on Mag. vol. 37 No. 6, Nov. 2001.
Planjery et al "Finite Alphabet Iterative Decoders, pt 1: Decoding Beyond Beliver Propogation on BSC" Jul. 2012, printed from the internet Apr. 21, 2014 http://arxiv.org/pdf/1207.4800.pd.
Richardson, T "Error Floors of LDPC Codes" Flarion Technologies Bedminster NJ 07921, tjr@flarion.com (not dated).
Shokrollahi "LDPC Codes: An Introduction", Digital Fountain, Inc. (Apr. 2, 2003).
Spagnol et al, "Hardware Implementation of GF(2 m) LDPC Decoders", IEEE Transactions on Circuits and Systemsši: Regular Papers, vol. 56, No. 12 (December 2009).
Tehrani et al., "Fully Parallel Stochastic LDPC Decoders", IEEE Transactions on Signal Processing, vol. 56, No. 11 (Nov. 2008).
Todd et al., "Enforcing maximum-transition-run code constraints and low-density parity check decoding", IEEE Trans. Magn., vol. 40, No. 6, pp. 3566-3571 (Nov. 2004).
U.S. Appl. No. 13/305,510, Unpublished filed Nov. 28, 2011 Lei Chen.
U.S. Appl. No. 13/186,234, Unpublished filed Jul. 19, 2011 Haitao Xia.
U.S. Appl. No. 13/213,751, Unpublished filed Aug. 19, 2011 Fan Zhang.
U.S. Appl. No. 13/545,833, Unpublished filed Jul. 10, 2012 Zhi Bin Li.
U.S. Appl. No. 14/025,104, Unpublished filed Sep. 12, 2013 Bruce Wilson.
U.S. Appl. No. 13/340,974, Unpublished filed Dec. 30, 2011 Dan Liu.
U.S. Appl. No. 13/340,951, Unpublished filed Dec. 30, 2011 Lei Chen.
U.S. Appl. No. 13/369,468, Unpublished filed Feb. 9, 2012 Zongwang Li.
U.S. Appl. No. 13/283,549, Unpublished filed Oct. 27, 2011 Wu Chang.
U.S. Appl. No. 13/180,495, Unpublished filed Jul. 11, 2011 Chung-Li Wang.
U.S. Appl. No. 13/302,119, Unpublished filed Nov. 22, 2011 Lei Chen.
U.S. Appl. No. 13/227,416, Unpublished filed Sep. 7, 2011 Lei Chen.
U.S. Appl. No. 13/305,551, Unpublished filed Nov. 28, 2011 Yang Han.
U.S. Appl. No. 13/296,022, Unpublished filed Nov. 14, 2011 Victor Krachkovsky.
U.S. Appl. No. 13/445,878, Unpublished filed Apr. 12, 2012 Yu Liao.
U.S. Appl. No. 13/174,537, Unpublished filed Jun. 30, 2011 Anantha Raman Krishnan.
U.S. Appl. No. 13/171,615, Unpublished filed Jun. 29, 2011 Bradley D. Seago.
U.S. Appl. No. 14/026,722, Unpublished filed Sep. 13, 2013 Shaohua Yang.
Xiao, et al "Nested Codes With Multiple Interpretations" retrieved from the Internet URL: http://www.ece.nmsu.edu/~jkliewer/paper/XFKC_CISSO6 (retrieved on Dec. 5, 2012).

* cited by examiner

SYSTEMS AND METHODS FOR RECOVERED DATA STITCHING

CROSS REFERENCE TO RELATED APPLICATIONS

The present application claims priority to (is a non-provisional of) U.S. Pat. App. No. 61/878,678 entitled "Systems and Methods for Recovered Data Stitching", and filed Sep. 17, 2013 by Yang et al., and from U.S. Pat. App. No. 61/885,314 entitled "Systems and Methods for Fragmented Data Recovery", and filed Oct. 1, 2013 by Xia et al. The entirety of the aforementioned provisional patent applications is incorporated herein by reference for all purposes.

FIELD OF THE INVENTION

Systems and method relating generally to data processing, and more particularly to systems and methods for combining recovered portions of a data set.

BACKGROUND

Data transfer devices often packetize data prior to sending the data across a transfer medium. This transfer medium may be, for example, a data transmission medium or a storage medium. Once the packetized data is received, it is reassembled to yield the original data. In some cases, errors are introduced through the reassembly process.

Hence, for at least the aforementioned reasons, there exists a need in the art for advanced systems and methods for data processing.

SUMMARY

Systems and method relating generally to data processing, and more particularly to systems and methods for combining recovered portions of a data set.

Various embodiments of the present invention provide data processing systems that include a stitching circuit and a data recovery circuit. The stitching circuit is operable to: receive a data set including at least a first fragment and a second fragment; replicate data from at least one of the first fragment and the second fragment as stitching values; aggregate the first fragment with the second fragment with the stitching values between the first fragment and the second fragment to yield a combined data set; and a data recovery circuit operable to process the combined data set to yield an original data set.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Systems and method relating generally to data processing, and more particularly to systems and methods for combining recovered portions of a data set.

Various embodiments of the present invention provide data processing systems that include a stitching circuit and a data recovery circuit. The stitching circuit is operable to: receive a data set including at least a first fragment and a second fragment; replicate data from at least one of the first fragment and the second fragment as stitching values; aggregate the first fragment with the second fragment with the stitching values between the first fragment and the second fragment to yield a combined data set; and a data recovery circuit operable to process the combined data set to yield an original data set. In some cases, the system is implemented as part of a communication device. In other instances, the system is implemented as part of a storage device. In particular cases, the system is implemented as part of an integrated circuit.

In some instances of the aforementioned embodiments, the stitching circuit includes a stitch value modification circuit that is operable to modify at least one of the stitching values to a transitional value between the last element of the first fragment and the first element of the second fragment. In such instances, aggregating the first fragment with the second fragment includes the modified stitching values between the first fragment and the second fragment. In some such instances, the data recovery circuit generates at least one hard decision output corresponding to the combined data set, and the transitional value is generated by the stitch value modification circuit based at least in part on the hard decision output. In one or more of the aforementioned embodiments, the transitional value smoothes a discontinuity between the first fragment and the second fragment.

In various instances of the aforementioned embodiments, replicating data from at least one of the first fragment and the second fragment as stitching values includes: replicating a value from the first fragment as a first set of stitching values, and replicating a value from the second fragment as a second set of stitching values. In such instances, aggregating the first fragment with the second fragment yields the first set of stitching values between the first fragment and the second set of stitching values, and the second set of stitching values between the first set of stitching values and the second fragment. In one particular case, the stitching circuit includes a stitch value modification circuit operable to modify at least one of the second set of stitching values to a transitional value between the last element of the first fragment and the first element of the second fragment. In such a case, aggregating the first fragment with the second fragment includes the modified stitching values between the first fragment and the second fragment. In some cases, the data recovery circuit generates at least one hard decision output corresponding to the combined data set, and wherein the transitional value is generated by the stitch value modification circuit based at least in part on the hard decision output.

In other instances of the aforementioned embodiments, the data recovery circuit includes a data detector circuit, a stitch stripping circuit, and a data decoder circuit. The data detector circuit is operable to apply a data detection algorithm to the combined data set to yield a detected output. The stitch stripping circuit is operable to strip elements of the detected output corresponding to the stitching values from the detected output to yield a decoder input. The data decoder circuit is operable to apply a data decoding algorithm to the decoder input to yield a decoded output.

Other embodiments of the present invention provide data processing systems that include: a stitching circuit and a data recovery circuit. The stitching circuit is operable to: receive a data set including at least a first fragment and a second fragment; calculate at least one stitching value as a transitional value between the last element of the first fragment and the first element of the second fragment; and aggregate the first fragment with the second fragment such that the stitching value is between the first fragment and the second fragment to yield a combined data set. The data recovery circuit is operable to process the combined data set to yield an original data set. In some cases, the system is implemented as part of a communication device. In other instances, the system is implemented as part of a storage device. In particular cases, the system is implemented as part of an integrated circuit.

In some instances of the aforementioned embodiments, the data recovery circuit generates at least one hard decision output corresponding to the combined data set, and the at least one stitching value is calculated based at least in part on the hard decision output. In some cases, the at least one stitching value is calculated based at least in part on the hard decision output, a value of the last element of the first fragment, and a first element of second fragment.

In various instances of the aforementioned embodiments, the data recovery circuit includes: a data detector circuit, a stitch stripping circuit, and a data decoder circuit. The data detector circuit is operable to apply a data detection algorithm to the combined data set to yield a detected output. The detected output includes a hard decision value. The stitch stripping circuit is operable to strip elements of the detected output corresponding to the stitching values from the detected output to yield a decoder input. The data decoder circuit is operable to apply a data decoding algorithm to the decoder input to yield a decoded output. In some cases, the data detection algorithm is a maximum a posteriori data detection algorithm. In other cases, the data detection algorithm is a Viterbi data detection algorithm. In some cases, the data decoding algorithm is a low density parity check algorithm.

Figure 1:
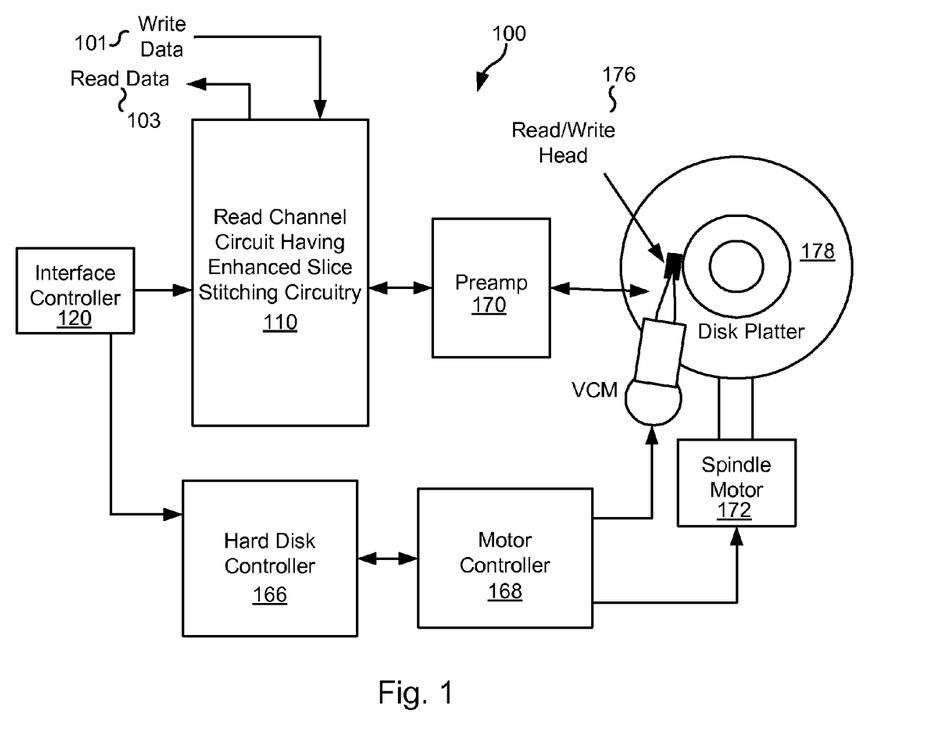
FIG. 1 shows a storage device including a read channel circuit having enhanced slice stitching circuitry in accordance with various embodiments of the present invention.

Turning to FIG. 1, a storage system 100 is shown that includes a read channel 110 having enhanced slice stitching circuitry in accordance with one or more embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178, and interacts with a host controller (not shown). The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head 176 is accurately positioned by motor controller 168 over a desired data track on disk platter 178. Motor controller 168 both positions read/write head 176 in relation to disk platter 178 and drives spindle motor 172 by moving read/write head assembly 176 to the proper data track on disk platter 178 under the direction of hard disk controller 166. Spindle motor 172 spins disk platter 178 at a determined spin rate (RPMs). Once read/write head 176 is positioned adjacent the proper data track, magnetic signals representing data on disk platter 178 are sensed by read/write head 176 as disk platter 178 is rotated by spindle motor 172. The sensed magnetic signals are provided as a continuous, minute analog signal representative of the magnetic data on disk platter 178. This minute analog signal is transferred from read/write head 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

In operation, data written to disk platter 178 is split into fragments or portions. When the data is read back from disk platter 178, the fragments or portions are reassembled and stitched together to yield the original data set. The data processing circuit may be implemented similar to that discussed below in relation to FIG. 4, FIG. 6 and/or FIG. 8. The data processing may be completed using a method such as that discussed in either FIG. 9 or FIG. 10 below.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
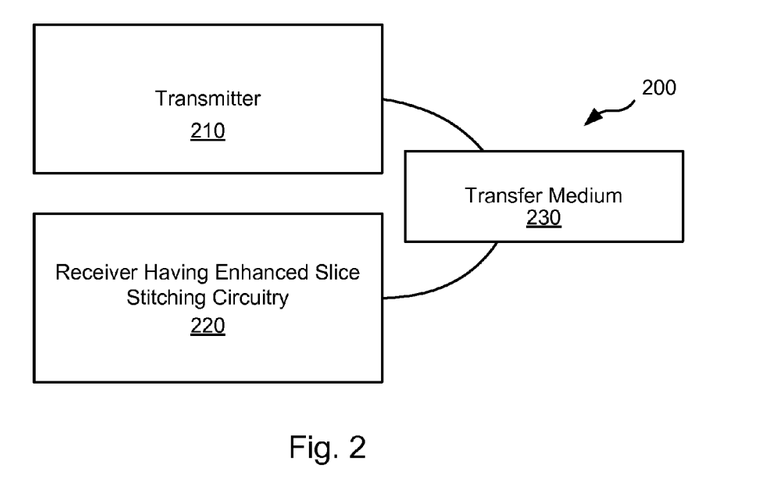
FIG. 2 shows a data transmission device including a receiver having enhanced slice stitching circuitry in accordance with one or more embodiments of the present invention.

Turning to FIG. 2, a data transmission system 200 including a receiver 220 enhanced slice stitching circuitry in accordance with one or more embodiments of the present invention. Transmitter 210 transmits encoded data via a transfer medium 230 as is known in the art. The encoded data is received from transfer medium 230 by receiver 220.

During operation, data sent by transmitter 210 is segregated into fragments or portions. When received by receiver 220, the fragments or portions are reassembled and stitched together to yield the original data set. The data processing circuit may be implemented similar to that discussed below in relation to FIG. 4, FIG. 6 and/or FIG. 8. The data processing may be completed using a method such as that discussed in either FIG. 9 or FIG. 10 below.

Figure 3:
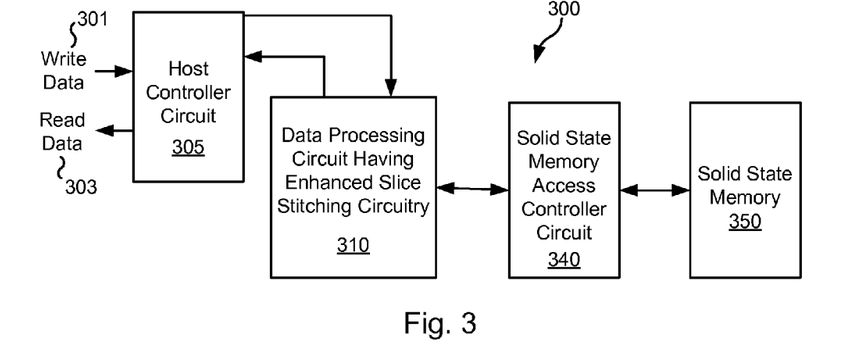
FIG. 3 shows a solid state memory circuit including a data processing circuit having enhanced slice stitching circuitry in accordance with some embodiments of the present invention.

Turning to FIG. 3, another storage system 300 is shown that includes a data processing circuit 310 having enhanced slice stitching circuitry in accordance with one or more embodiments of the present invention. A host controller circuit 305 receives data to be stored (i.e., write data 301). This data is segregated into fragments or portions by data processing circuit 310 prior to being transferred to a solid state memory access controller circuit 340. Solid state memory access controller circuit 340 may be any circuit known in the art that is capable of controlling access to and from a solid state memory. Solid state memory access controller circuit 340 formats the received encoded data for transfer to a solid state memory 350. Solid state memory 350 may be any solid state memory known in the art. In some embodiments of the present invention, solid state memory 350 is a flash memory. Later, when the previously written data is to be accessed from solid state memory 350, solid state memory access controller circuit 340 requests the data from solid state memory 350 and provides the requested data to data processing circuit 310. In turn, data processing circuit 310 reassembles and stitches the fragments to yield the original data set. The data processing circuit may be implemented similar to that discussed below in relation to FIG. 4, FIG. 6 and/or FIG. 8. The data processing may be completed using a method such as that discussed in either FIG. 9 or FIG. 10 below.

Figure 4:
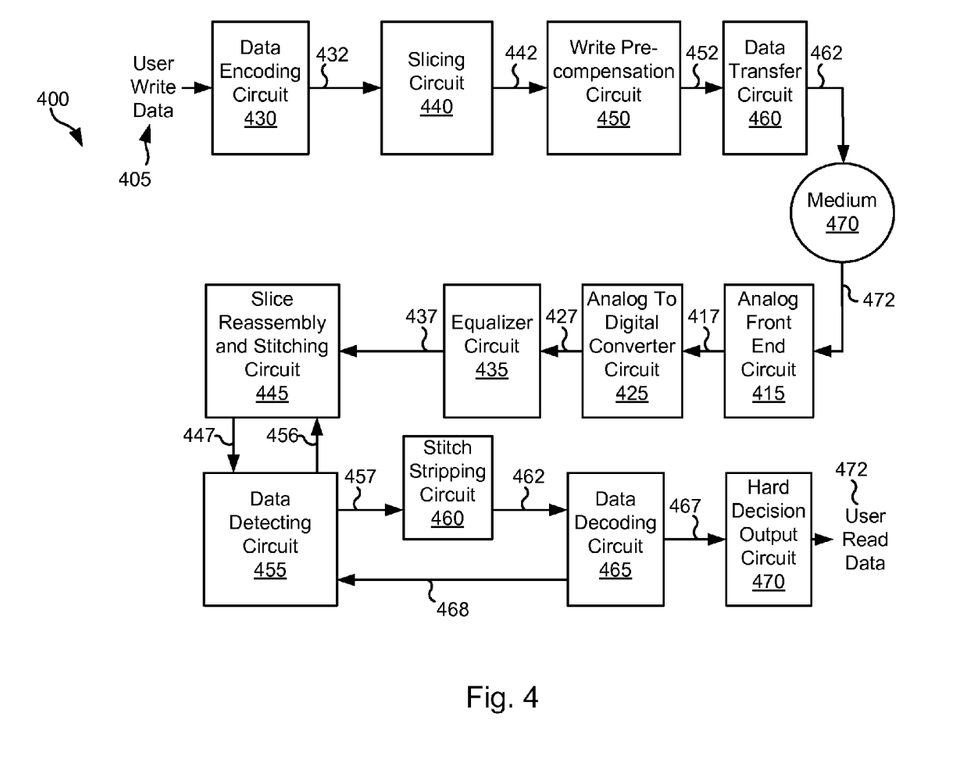
FIG. 4 shows a data transfer circuit transferring data via a medium and including a slice reassembly and stitching circuit in accordance with various embodiments of the present invention.

Turning to FIG. 4, a data transfer circuit 400 is shown that includes a slice reassembly and stitching circuit 445 in accordance with various embodiments of the present invention. Data transfer circuit 400 includes a data encoding circuit 430 that is operable to apply a data encoding algorithm to user write data 405 to yield an encoded output 432. In some embodiments of the present invention, data encoding circuit 430 applies a low density parity check encoding algorithm as is known in the art. Based upon the disclosure provided herein, one of ordinary skill in the art will recognize a variety of encoding algorithms and/or combinations of encoding algorithms that may be implemented in accordance with different embodiments of the present invention.

Figure 5A:
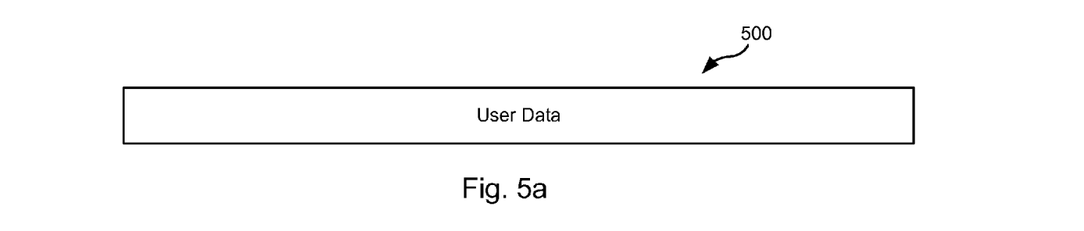
FIGS. 5a-5e graphically depict data processing in accordance with some embodiments of the present invention.
Figure 5B:
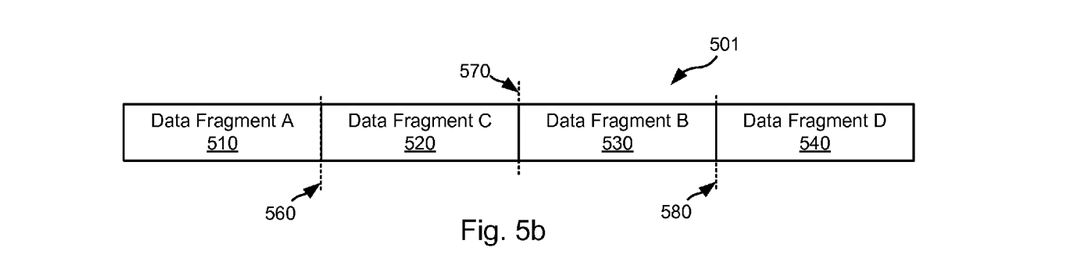

Encoded output 432 is provided to a slicing circuit 440 that segregates encoded output 432 into a number of fragments or portions that are provided as a portion output 442 to a write pre-compensation circuit 450. FIGS. 5a-5b graphically depict a segregated data set 501 that includes segregation of user data 500 into fragments similar to that done by slicing circuit 440. As shown, a user data 500 in FIG. 5a is divided into a data fragment A 510, a data fragment B 530, a data fragment C 520, and a data fragment D 540. The aforementioned data fragments are divided at boundaries 560, 570, 580. In the case of FIG. 4, user data 500 corresponds to encoded output 432, and segregated data set 501 corresponds to portion output 442. In some cases, the portions of portion output 442 are also interleaved (i.e., shuffled) such that the effects of any localized noise is spread out across different areas. In user data 500, the data corresponding to Fragment B 530 directly follows the data corresponding to Fragment A 510; the data corresponding to Fragment C 520 directly follows the data corresponding to Fragment B 530; and the data corresponding to Fragment D 540 directly follows the data corresponding to Fragment C 520. The aforementioned interleaving is represented by Fragment C 520 following Fragment A 510, instead of Fragment B 530 following Fragment A 510.

Write pre-compensation circuit 450 generates a compensated output 452 that is provided to a data transfer circuit 460. Data transfer circuit 460 may be any circuit capable of providing the received information to a transfer medium 470 as a data output 462. As such, data transfer circuit 460 may be, but is not limited to, a solid state storage device write circuit, a magnetic storage device write circuit, or a data transmission circuit.

Data output 462 is received by an analog front end circuit 415 from medium 470 as a read input 472. Analog front end circuit 415 processes read input 472 to yield a processed analog signal 417 that is provided to an analog to digital converter circuit 425. Analog front end circuit 415 may include, but is not limited to, an analog filter and an amplifier circuit as are known in the art. Based upon the disclosure provided herein, one of ordinary skill in the art will recognize a variety of circuitry that may be included as part of analog front end circuit 415. Analog to digital converter circuit 425 converts processed analog signal 417 into a corresponding series of digital samples 427. Analog to digital converter circuit 425 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 427 are provided to an equalizer circuit 435. Equalizer circuit 435 applies an equalization algorithm to digital samples 427 to yield an equalized output 437. In some embodiments of the present invention, equalizer circuit 435 is a digital finite impulse response filter circuit as are known in the art.

Figure 5C:
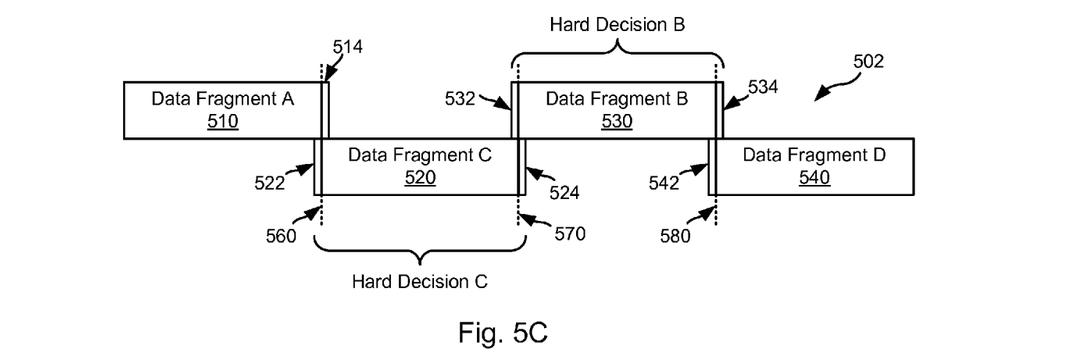

Equalized output 437 is provided to slice reassembly and stitching circuit 445. Slice reassembly and stitching circuit 445 is operable to replicate some of the instances of equalized output 437 at the boundaries of the respective samples. In one particular embodiment of the present invention, three instances of equalized output 437 on either side of a given fragment are replicated. Turning to FIG. 5c, the instance replication is shown. In particular, at the end of data fragment A 510, the last three instances data fragment A 510 in equalized output 437 are replicated as stitching bits 514. At the beginning of data fragment C 520, the first three instances data fragment C 520 in equalized output 437 are replicated as stitching bits 522. At the end of data fragment C 520, the last three instances data fragment C 520 in equalized output 437 are replicated as stitching bits 524. At the beginning of data fragment B 530, the first three instances data fragment B 530 in equalized output 437 are replicated as stitching bits 532. At the end of data fragment B 530, the last three instances data fragment B 530 in equalized output 437 are replicated as stitching bits 534. At the beginning of data fragment D 540, the first three instances data fragment D 540 in equalized output 437 are replicated as stitching bits 542.

Figure 5D:
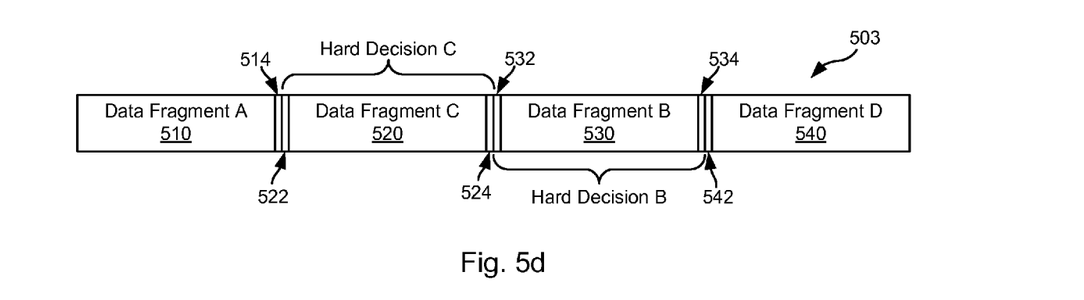

Slice reassembly and stitching circuit 445 assembles the respective fragments along with the replicated instances of equalized output 437 to yield an overall data set. Turning to FIG. 5d, an example of the resulting overall data set 503 is shown. As shown, data fragment A 510 plus stitching bits 514 precede data fragment C 530 plus stitching bits 522 and stitching bits 524. Data fragment C 520 plus stitching bits 522 and stitching bits 524 precedes data fragment B 530 plus stitching bits 532 and stitching bits 534. Data fragment B 530 plus stitching bits 532 and stitching bits 534 precedes data fragment D 540 plus stitching bits 542.

Figure 6:
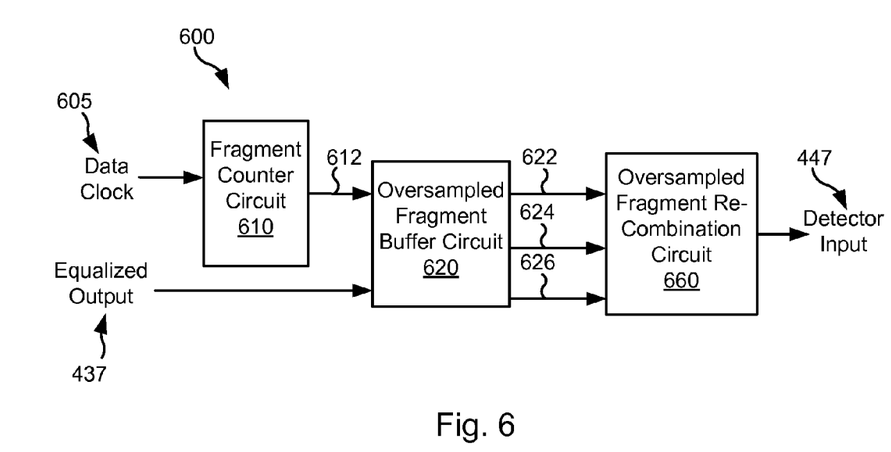
FIG. 6 shows a detailed block diagram of a data reassembly and stitching circuit in accordance with one or more embodiments of the present invention.

Slice reassembly and stitching circuit 445 then stitches the boundaries between the stitching bits. In one particular embodiment of the present invention, the stitching simply includes appending stitching bits 522 to stitching bits 514, appending stitching bits 532 to stitching bits 524, and appending stitching bits 542 to stitching bits 534. FIG. 6 shows a detailed block diagram of a data reassembly and stitching circuit 600 that may be used in place of slice reassembly and stitching circuit 445 in accordance with one or more embodiments of the present invention. Data reassembly and stitching circuit 600 includes a fragment counter circuit 610 that is incremented as each instance of equalized output 437 is received. The resulting count value 612 indicates the beginning and end of fragments in equalized output 437. Once the end of a fragment is indicated by count value 612, fragment counter circuit 610 is reset to indicate the beginning of the next fragment.

Count value 612 is provided to an oversampled fragment buffer circuit 620 that stores instances of equalized output 437, and replicates instances of equalized output at the beginning and end of each fragment. The respective fragments are provided as a fragment output 622, a preceding stitching bits (e.g., stitching bits 522, stitching bits 532, and stitching bits 542) are provided as preceding stitching bits 624, and stitching bits (e.g., stitching bits 514, stitching bits 524, and stitching bits 534) are provided as succeeding stitching bits 626. Fragment output 622, preceding stitching bits 624, and succeeding stitching bits 626 are provided to an oversampled fragment recombination circuit 660 that assembles the various portions to make oversampled packets (e.g., Fragment C 520 plus stitching bits 522 and stitching bits 524; Fragment B 530 plus stitching bits 532 and stitching bits 534). These oversampled packets are then provided to data detecting circuit 455 as a detector input 447.

Data detecting circuit 455 may be any circuit known in the art that is capable of apply a data detection algorithm to a data set to yield a detected output. As some examples, data detecting circuit 455 may be, but is not limited to, a Viterbi algorithm detector circuit or a maximum a posteriori detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detecting circuits that may be used in relation to different embodiments of the present invention. Detected output 457 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention. The hard decisions from detected output 457 are provided as a hard decision output 456 from data detecting circuit 455 to slice reassembly and stitching circuit 445.

Figure 7A:
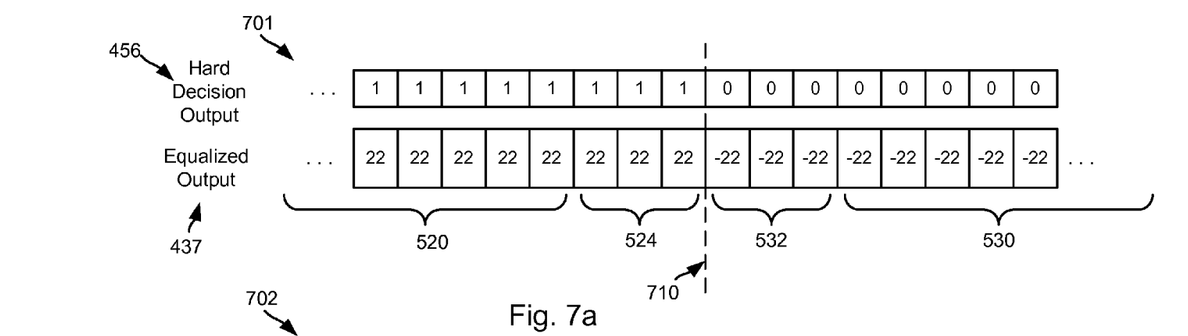
FIG. 7a graphically depicts data stitching without stitch value modification in accordance with some embodiments of the present invention.

Turning to FIG. 7a, data stitching without stitch value modification such as that discussed in relation to FIG. 6 is graphically depicted in accordance with some embodiments of the present invention. Equalized output 437 is shown juxtaposed with hard decision output 456. As shown, there is a severe transition 710 (i.e., from +22 to −22) where stitching bits 532 are appended to stitching bits 524. Such a severe transition may disrupt operation of data detecting circuit 455 that may rely on a reasonably continuous signal input.

In other embodiments of the present invention, the severity of the transition is mitigated by stitching processes that modify one or more of the stitching bits between succeeding data fragments. Such stitching processes include: modifying one or more of stitching bits 514 and stitching bits 522 to smooth a transition between the last instance of data fragment A 510 and the first instance of data fragment C 520; modifying one or more of stitching bits 524 and stitching bits 532 to smooth a transition between the last instance of data fragment C 520 and the first instance of data fragment B 530; and modifying one or more of stitching bits 534 and stitching bits 542 to smooth a transition between the last instance of data fragment B 530 and the first instance of data fragment D 540. Smoothing the transition between succeeding data fragments avoids disrupting operation of a data detecting circuit 455 caused by severe discontinuities between fragments.

Figure 8:
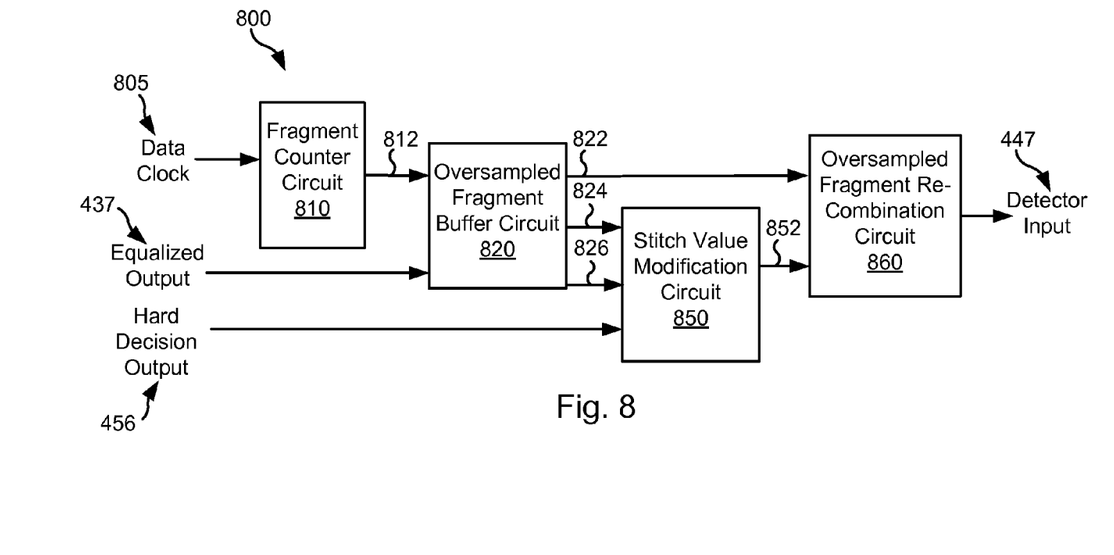
FIG. 8 shows a detailed block diagram of a data reassembly and stitching circuit including a stitch value modification circuit in accordance with some embodiments of the present invention.

FIG. 8 shows a detailed block diagram of a data reassembly and stitching circuit 800 that may be used in place of slice reassembly and stitching circuit 445 in accordance with one or more embodiments of the present invention using a stitch modification process. Data reassembly and stitching circuit 800 includes a fragment counter circuit 810 that is incremented as each instance of equalized output 437 is received. The resulting count value 812 indicates the beginning and end of fragments in equalized output 437. Once the end of a fragment is indicated by count value 812, fragment counter circuit 810 is reset to indicate the beginning of the next fragment.

Count value 812 is provided to an oversampled fragment buffer circuit 820 that stores instances of equalized output 437, and replicates instances of equalized output at the beginning and end of each fragment. The respective fragments are provided as a fragment output 822, a preceding stitching bits (e.g., stitching bits 522, stitching bits 532, and stitching bits 542) are provided as preceding stitching bits 824, and stitching bits (e.g., stitching bits 514, stitching bits 524, and stitching bits 534) are provided as succeeding stitching bits 826. Preceding stitching bits 824, succeeding stitching bits 826, and hard decision output 456 are provided to a stitch value modification circuit 850.

Figures 5E, 7B:
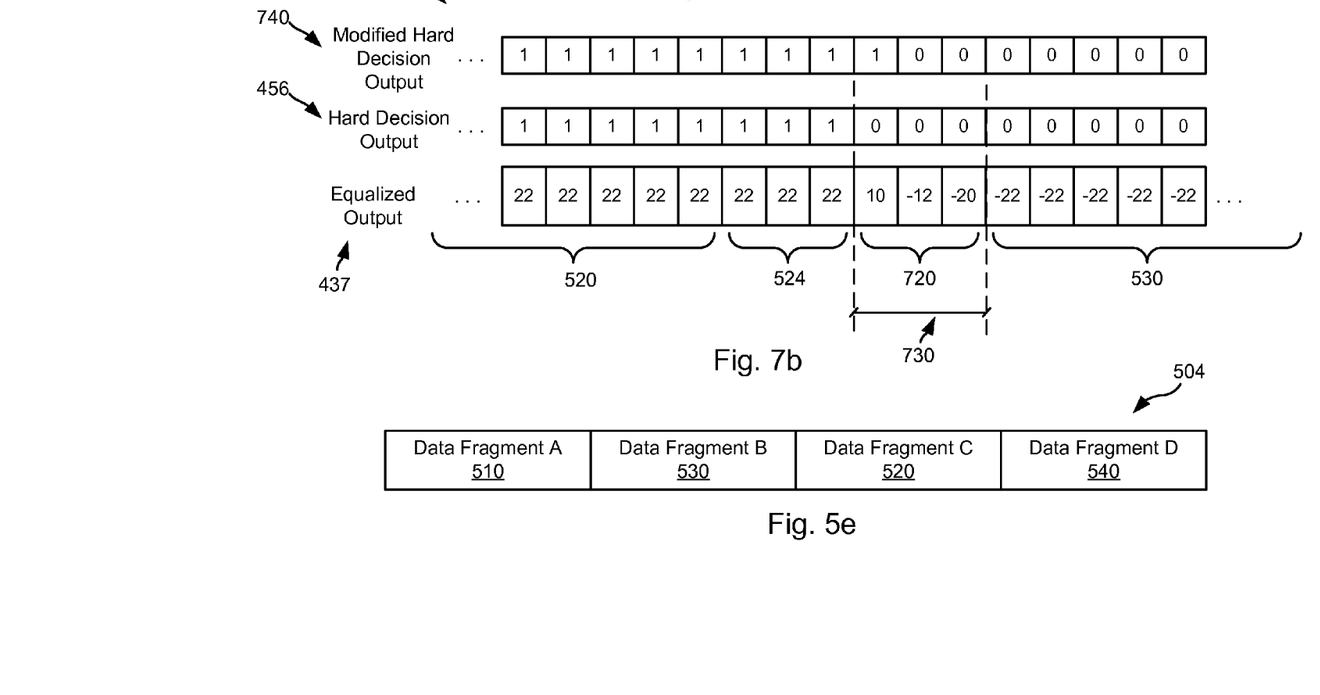
FIG. 7b graphically depicts data stitching including stitch value modification in accordance with other embodiments of the present invention.

Stitch value modification circuit 850 modifies one or more stitch values based upon hard decision output 456. Each sample (including the stitch values) received as equalized output 437 can be expressed as:

Equalized Output$_k$=Ideal Equalized Output$_k$+$n_k$, where k indicates the particular instance of equalized output 437, and $n_k$ is the noise included in each instance of equalized output 437. The preceding may be expressed as:

$$\text{Equalized Output}_k = \sum_{j=0}^{L-1} (\text{Hard Decision Output}_{k-j} T_j) + n_k,$$

where $T_k$ is the target value used in a target filter to yield the ideal equalized output, and L is the target length. In some embodiments of the present invention, stitch value modification circuit 850 modifies three stitch values immediately preceding a fragment while leaving other stitch values unmodified. Using FIG. 7b as an example, stitching bits 524 are not modified and stitching bits 532 are modified to yield stitching bits 720. In FIG. 7b, equalized output 437 is shown juxtaposed with hard decision output 456. As shown, there is a smoothed transition 730 by modifying the values of stitching bits 532 to yield modified stitching bits 720 where stitching bits 532 are appended to stitching bits 524. Such a smoothed transition is less likely to disrupt operation of data detecting circuit 455 when compared with a more severe transition. The value of modified stitching values 720 may be expressed as:

$$\text{Modified Stitching Values}_k = \sum_{j=0}^{L-1} (\text{Modified Hard Decision Output}_{k-j} T_j) +$$
$$\text{Equalized Output}_k - \sum_{j=0}^{L-1} (\text{Hard Decision Output}_{k-j} T_j),$$

where the modified hard decision output is the hard decision corresponding to the modified stitching values. As shown in FIG. 7b, by applying the stitch value modification as previously discussed, modified stitching values 720 are changed from −22, −22, −22 to 10, −12, −20, respectively.

The resulting modified stitch values 852 generated by stitch value modification circuit 850 are provided along with fragment output 822 to an oversampled fragment recombination circuit 860 that assembles the various portions to make oversampled packets (e.g., Fragment C 520 plus stitching bits 522 and stitching bits 524; Fragment B 530 plus stitching bits 532 and stitching bits 534). These oversampled packets are then provided to data detecting circuit 455 as detector input 447.

Detected output 457 is provided to a stitch stripping circuit 463. Stitch stripping circuit 463 de-interleaves the data sets (i.e., puts the fragments in the original order provided by data encoding circuit 430) and removes the stitching bits from between the fragments (either stitching bits or modified stitching bits) to yield a decoder input 464. Turning to FIG. 5e, an example of a de-interleaved and stitch removed data set 504. As shown, de-interleaved and stitch removed data set 504 includes data fragment A 510 followed by data fragment B 530, data fragment B 530 is followed by data fragment C 520, and data fragment C 520 is followed by data fragment D 540.

Decoder input 464 is provided to a data decoding circuit 465 that applies a data decoding algorithm to the received input to yield a decoded output 467. In one particular embodiment of the present invention, data decoding circuit 465 is operable to apply a low density parity check decoded circuit. Where decoded output 467 fails to converge (i.e., fails to reflect the original data), it is provided as a feedback 468 to data detecting circuit 455 to apply another iteration of the combination of data detecting circuit 455 and data decoding circuit 465. Alternatively, where decoded output 467 does converge (i.e., reflects the original data), it is provided to a hard decision output circuit 475 that provides the resulting hard decisions as user read data 477.

Figure 9:
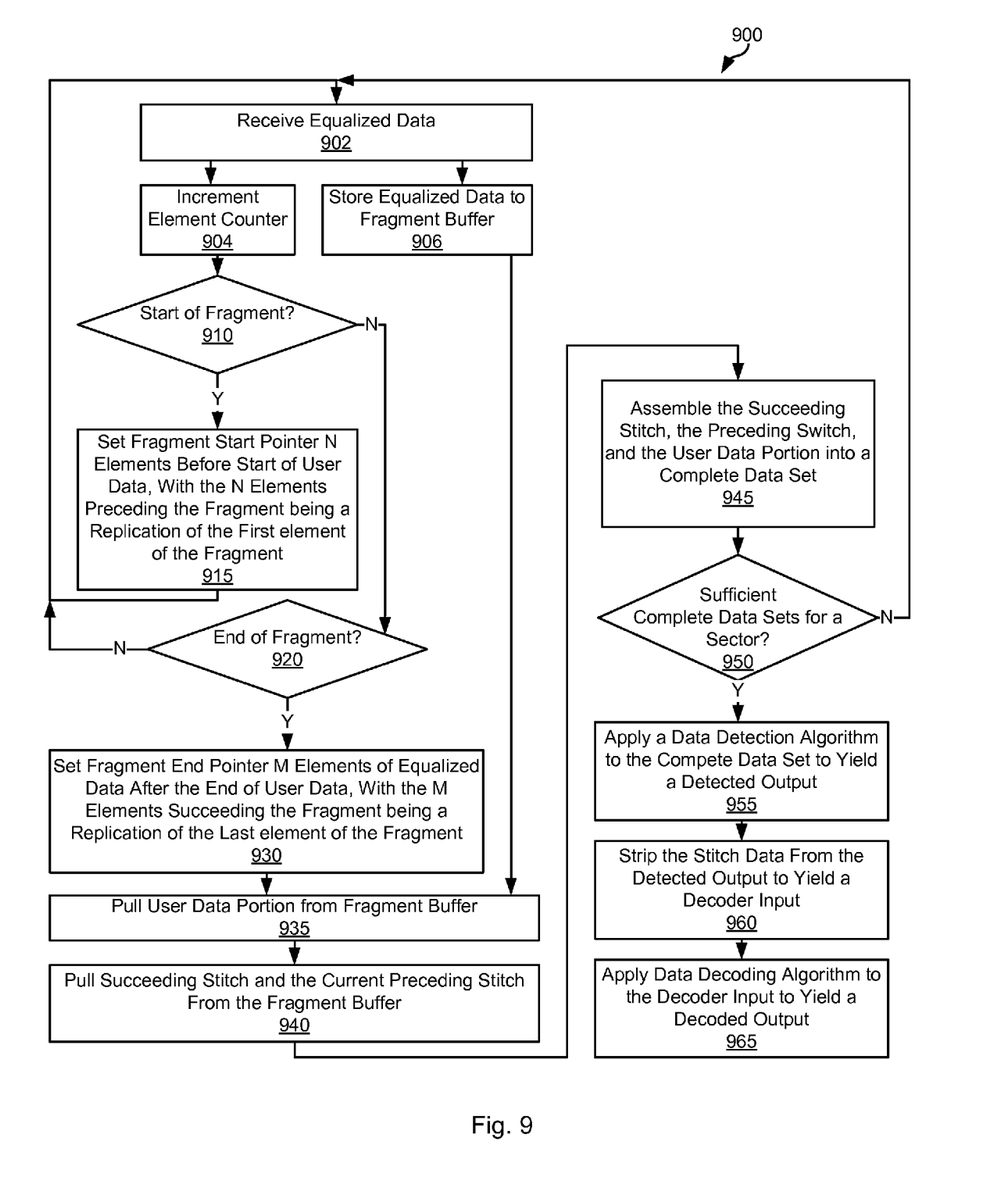
FIG. 9 is a flow diagram showing a method in accordance with some embodiments of the present invention for data reassembly and stitching without stitch value modification.

Turning to FIG. 9, a flow diagram 900 shows a method in accordance with some embodiments of the present invention for data reassembly and stitching without stitch value modification. Following flow diagram 900, an equalized output is received (block 902). The equalized output may be derived, for example, from data accessed from a storage medium or a transmission medium. Based upon the disclosure provided herein, one of ordinary skill in the art will recognize a variety of sources from which the equalized output may be derived. An element counter is incremented as each instance of the equalized output is received (block 904). This element counter is responsible for indicating the beginning and end of fragments within the equalized outputs. Once the end of a fragment is indicated, the counter is reset indicating the beginning of the subsequent fragment. In addition, each element of the equalized output is stored to a fragment buffer (block 906).

Based upon the element counter it is determined whether the start of a fragment has been found (block 910). Where the start of a fragment has been found (block 910), a fragment start pointer is set to point N elements before the start of the fragment in the fragment buffer (block 915). The N elements preceding the fragment are the preceding stitching bits (i.e., preceding stitch) that are set equal to the value of the first element of the fragment. Alternatively, where the start of a fragment has not been found (block 910), it is determined whether an end of fragment has occurred (block 920). Where the end of a fragment has been found (block 920), a fragment end pointer is set to point M elements beyond the end of the fragment (block 930). The M elements succeeding the fragment are the current succeeding stitching bits (i.e., succeeding stitch) that are set equal to the value of the last element of the fragment.

The user data portion of the fragment (i.e., everything but the preceding stitch and the succeeding stitch) is pulled from the fragment buffer (block 935). In addition, the succeeding stitch and the preceding stitch are also pulled from the fragment buffer (block 940). The preceding stitch, the succeeding switch, and the user data portion are assembled into a complete data set (block 945). An example of such a complete data set is shown in FIG. 5d including data fragment C530 preceded by stitching bits 522 and stitching bits 524.

It is then determined if sufficient complete data sets have been received to form a complete sector of data (block 950). A sector is the size of an original encoded data set prior to being segregated into fragments. In some embodiments of the present invention, a sector is 4K bits. Where sufficient complete data sets have been received (block 950), the complete data sets are appended one to another and a data detection algorithm is applied to the complete data set to yield a detected output (block 955). The appended complete data sets may be similar to that shown as overall data set 503 of FIG. 5d. The data detection algorithm may be any data detection algorithm known in the art including, but not limited to, a Viterbi data detection algorithm or a maximum a posteriori data detection algorithm. Based upon the disclosure provided herein, one of ordinary skill in the art will recognize a variety of data detection algorithms that may be used in relation to different embodiments of the present invention. The stitch bits are then stripped from the appended complete data sets and where applicable the data sets are un-shuffled to yield a decoder input (block 960). The decoder input may look similar to de-interleaved and stitch removed data set 504 of FIG. 5e. A data decoding algorithm is then applied to the decoder input to yield a decoded output (block 965). The data decoding algorithm may be, for example, a low density parity check decoding algorithm as are known in the art. Based upon the disclosure provided herein, one of ordinary skill in the art will recognize a variety of data decoding algorithms that may be used in relation to different embodiments of the present invention.

Figure 10:
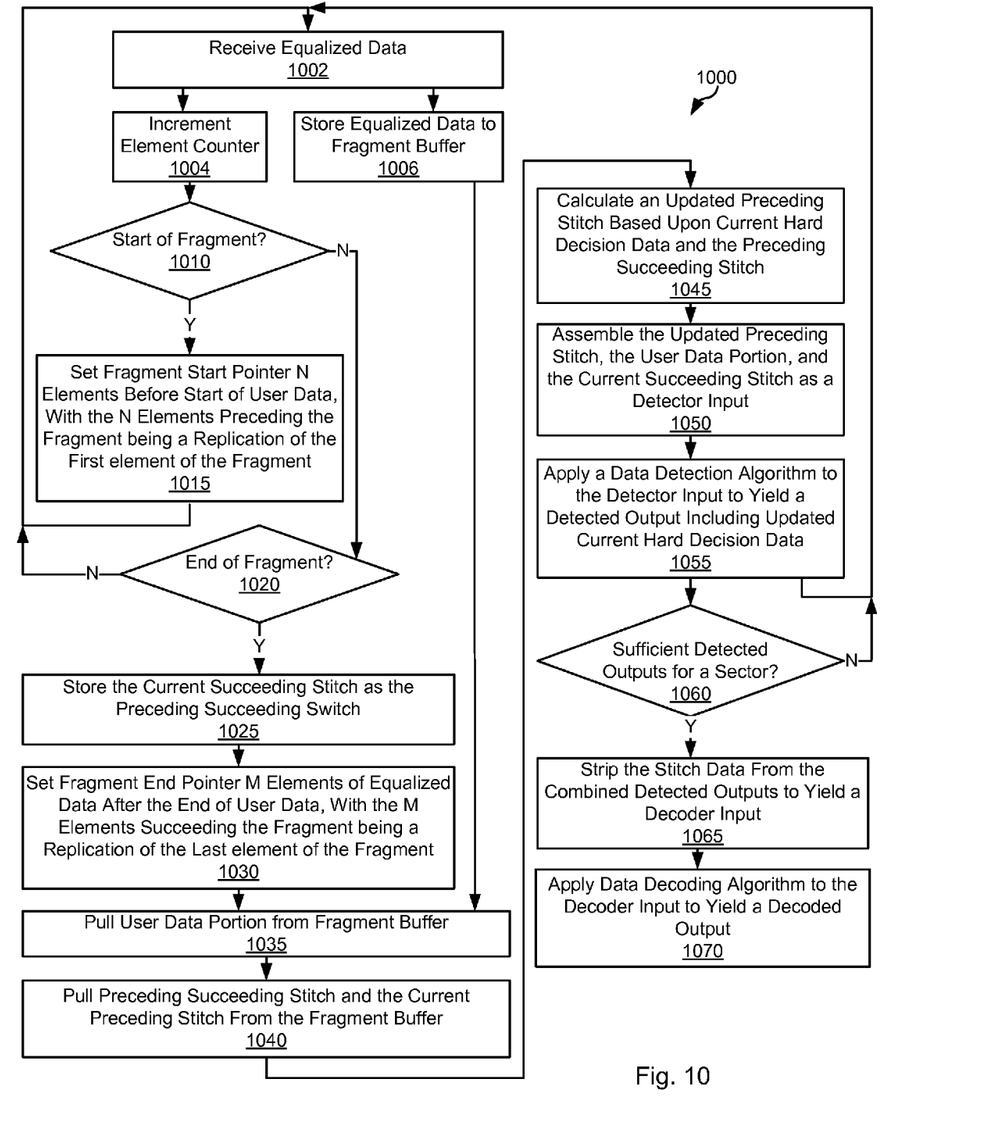
FIG. 10 is a flow diagram showing a method in accordance with other embodiments of the present invention for data reassembly and stitching including stitch value modification.

Turning to FIG. 10, a flow diagram 1000 shows a method in accordance with other embodiments of the present invention for data reassembly and stitching including stitch value modification. Following flow diagram 1000, an equalized output is received (block 1002). The equalized output may be derived, for example, from data accessed from a storage medium or a transmission medium. Based upon the disclosure provided herein, one of ordinary skill in the art will recognize a variety of sources from which the equalized output may be derived. An element counter is incremented as each instance of the equalized output is received (block 1004). This element counter is responsible for indicating the beginning and end of fragments within the equalized outputs. Once the end of a fragment is indicated, the counter is reset indicating the beginning of the subsequent fragment. In addition, each element of the equalized output is stored to a fragment buffer (block 1006).

Based upon the element counter it is determined whether the start of a fragment has been found (block 1010). Where the start of a fragment has been found (block 1010), a fragment start pointer is set to point N elements before the start of the fragment in the fragment buffer (block 1015). The N elements preceding the fragment are the preceding stitching bits (i.e., preceding stitch) that are set equal to the value of the first element of the fragment. Alternatively, where the start of a fragment has not been found (block 1010), it is determined whether an end of fragment has occurred (block 1020). Where the end of a fragment has been found (block 1020), the current succeeding stitch is stored as the preceding succeeding stitch (block 1025). In addition, a fragment end pointer is set to point M elements beyond the end of the fragment (block 1030). The M elements succeeding the fragment are the current succeeding stitching bits (i.e., succeeding stitch) that are set equal to the value of the last element of the fragment.

The user data portion of the fragment (i.e., everything but the preceding stitch and the succeeding stitch) is pulled from the fragment buffer (block 1035). In addition, the succeeding stitch and the preceding stitch are also pulled from the fragment buffer (block 1040). An updated preceding stitch is calculated based upon current hard decision data and the preceding succeeding switch (block 1045). Referring to FIGS. 4, 5d and 7b, the stitch value modification results in modifying one or more stitch values based upon hard decision outputs resulting from application of a data detection algorithm. Each sample (including the stitch values) received as the equalized output (block 1002) can be expressed as:

$$\text{Equalized Output}_k = \text{Ideal Equalized Output}_k + n_k,$$

where k indicates the particular instance of the equalized output, and $n_k$ is the noise included in each instance of the equalized output. The preceding may be expressed as:

$$\text{Equalized Output}_k = \sum_{j=0}^{L-1} (\text{Hard Decision Output}_{k-j} T_j) + n_k,$$

where $T_k$ is the target value used in a target filter to yield the ideal equalized output, and L is the target length. In some embodiments of the present invention, the stitch value modification modifies three stitch values immediately preceding a fragment while leaving other stitch values unmodified. Using FIG. 7b as an example, stitching bits 524 are not modified and stitching bits 532 are modified to yield stitching bits 720. In FIG. 7b, equalized output 437 is shown juxtaposed with hard decision output 456. As shown, there is a smoothed transition 730 by modifying the values of stitching bits 532 to yield modified stitching bits 720 where stitching bits 532 are appended to stitching bits 524. Such a smoothed transition is less likely to disrupt operation of data detecting circuit 455 when compared with a more severe transition. The value of modified stitching values 720 may be expressed as:

$$\text{Modified Stitching Values}_k = \sum_{j=0}^{L-1} (\text{Modified Hard Decision Output}_{k-j} T_j) +$$

$$\text{Equalized Output}_k - \sum_{j=0}^{L-1} (\text{Hard Decision Output}_{k-j} T_j),$$

where the modified hard decision output is the hard decision corresponding to the modified stitching values. As shown in FIG. 7b, by applying the stitch value modification as previously discussed, modified stitching values 720 are changed from −22, −22, −22 to 10, −12, −20, respectively.

The updated preceding stitch, the fragment, and the current succeeding stitch are assembled into a complete data set (block 1050). A data detection algorithm is applied to the complete data set to yield a detected output (block 1055). The detected output includes updated current hard decision data. The data detection algorithm may be any data detection algorithm known in the art including, but not limited to, a Viterbi data detection algorithm or a maximum a posteriori data detection algorithm. Based upon the disclosure provided herein, one of ordinary skill in the art will recognize a variety of data detection algorithms that may be used in relation to different embodiments of the present invention. It is then determined if sufficient detected outputs have been received to form a complete sector of data (block 1060). A sector is the size of an original encoded data set prior to being segregated into fragments. In some embodiments of the present invention, a sector is 4K bits. Where sufficient complete data sets have been received (block 1060), the stitch bits are stripped from the detected output and the various fragments are reordered (i.e., de-interleaved) where applicable to yield a decoder input (block 1065). The decoder input may look similar to de-interleaved and stitch removed data set 504 of FIG. 5e. A data decoding algorithm is then applied to the decoder input to yield a decoded output (block 1070). The data decoding algorithm may be, for example, a low density parity check decoding algorithm as are known in the art. Based upon the disclosure provided herein, one of ordinary skill in the art will recognize a variety of data decoding algorithms that may be used in relation to different embodiments of the present invention.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
    a stitching circuit operable to:
        receive a data set including at least a first fragment and a second fragment;
        replicate data from at least one of the first fragment and the second fragment as stitching values;
        aggregate the first fragment with the second fragment with the stitching values between the first fragment and the second fragment to yield a combined data set; and
    a data recovery circuit operable to process the combined data set to yield an original data set.

2. The system of claim 1, wherein the stitching circuit comprises:
    a stitch value modification circuit operable to modify at least one of the stitching values to a transitional value between a last element of the first fragment and a first element of the second fragment to yield a modified stitching value; and
    wherein aggregating the first fragment with the second fragment includes the modified stitching value between the first fragment and the second fragment.

3. The system of claim 2, wherein the data recovery circuit generates at least one hard decision output corresponding to the combined data set, and wherein the transitional value is generated by the stitch value modification circuit based at least in part on the hard decision output.

4. The system of claim 2, wherein the transitional value smoothes a discontinuity between the first fragment and the second fragment.

5. The system of claim 1, replicating data from at least one of the first fragment and the second fragment as stitching values comprises:
    replicating a first value from the first fragment as a first set of stitching values;
    replicating a second value from the second fragment as a second set of stitching values; and
    wherein aggregating the first fragment with the second fragment yields the first set of stitching values between the first fragment and the second set of stitching values, and the second set of stitching values between the first set of stitching values and the second fragment.

6. The system of claim 5, wherein the stitching circuit comprises:
    a stitch value modification circuit operable to modify at least one of the second set of stitching values to a transitional value between a last element of the first fragment and a first element of the second fragment to yield a modified stitching value; and
    wherein aggregating the first fragment with the second fragment includes the modified stitching values between the first fragment and the second fragment.

7. The system of claim 6, wherein the data recovery circuit generates at least one hard decision output corresponding to the combined data set, and wherein the transitional value is generated by the stitch value modification circuit based at least in part on the hard decision output.

8. The system of claim 1, wherein the data recovery circuit comprises:
    a data detector circuit operable to apply a data detection algorithm to the combined data set to yield a detected output;

a stitch stripping circuit operable to strip elements of the detected output corresponding to the stitching values from the detected output to yield a decoder input; and a data decoder circuit operable to apply a data decoding algorithm to the decoder input to yield a decoded output.

9. The system of claim 1, wherein the system is implemented as part of a device selected from a group consisting of: a communication device, and a storage device.

10. The system of claim 1, wherein the system is implemented as part of an integrated circuit.

11. A data processing system, the system comprising:
a stitching circuit operable to:
receive a data set including at least a first fragment and a second fragment;
calculate at least one stitching value as a transitional value between a last element of the first fragment and a first element of the second fragment;
aggregate the first fragment with the second fragment such that the stitching value is between the first fragment and the second fragment to yield a combined data set; and
a data recovery circuit operable to process the combined data set to yield an original data set.

12. The system of claim 11, wherein the data recovery circuit generates at least one hard decision output corresponding to the combined data set, and wherein the at least one stitching value is calculated based at least in part on the hard decision output.

13. The system of claim 12, wherein the at least one stitching value is calculated based at least in part on the hard decision output, a value of the last element of the first fragment, and a first element of second fragment.

14. The system of claim 11, wherein the data recovery circuit comprises:
a data detector circuit operable to apply a data detection algorithm to the combined data set to yield a detected output, wherein the detected output includes a hard decision value;
a stitch stripping circuit operable to strip elements of the detected output corresponding to the at least one stitching values from the detected output to yield a decoder input; and
a data decoder circuit operable to apply a data decoding algorithm to the decoder input to yield a decoded output.

15. The system of claim 14, wherein the data detection algorithm is selected from a group consisting of: a maximum a posteriori data detection algorithm, and a Viterbi data detection algorithm.

16. The system of claim 14, wherein the data decoding algorithm is a low density parity check algorithm.

17. The system of claim 14, wherein the at least one stitching value is calculated based at least in part on the hard decision output.

18. The system of claim 11, wherein the system is implemented as part of a device selected from a group consisting of: a communication device, and a storage device.

19. The system of claim 11, wherein the system is implemented as part of an integrated circuit.

20. A hard disk drive, the hard disk drive comprising:
a disk platter including a stored information;
a head assembly disposed in relation to the disk platter and operable to:
sense the stored information to yield sensed information;
provide a signal corresponding to the sensed information;
an analog to digital converter circuit operable to convert the sensed information to a series of digital samples;
an equalizer circuit operable to equalize the digital samples to yield an equalized output, wherein the equalized output includes a first fragment of data and a second fragment of data;
a stitching circuit operable to:
calculate at least one stitching value as a transitional value between a last element of the first fragment of data and a first element of the second fragment of data;
aggregate the first fragment of data with the second fragment of data such that the at least one stitching value is between the first fragment of data and the second fragment of data to yield a combined data set; and
a data detector circuit operable to apply a data detection algorithm to the combined data set to yield a detected output, wherein the detected output includes a hard decision value;
a stitch stripping circuit operable to strip elements of the detected output corresponding to the at least one stitching values from the detected output to yield a decoder input;
a data decoder circuit operable to apply a data decoding algorithm to the decoder input to yield a decoded output; and
wherein the at least one stitching value is calculated based at least in part on the hard decision output, a value of the last element of the first fragment, and a first element of second fragment.

* * * * *